United States Patent [19]

Becker

[11] Patent Number: 5,274,919
[45] Date of Patent: Jan. 4, 1994

[54] METHOD OF CRACKING A CONNECTING ROD

[75] Inventor: Larry T. Becker, Milton, Wis.

[73] Assignee: Giddings & Lewis, Inc., Fond du Lac, Wis.

[21] Appl. No.: 880,944

[22] Filed: May 8, 1992

[51] Int. Cl.$^5$ .............................................. B23P 15/10
[52] U.S. Cl. .................................................. 29/888.09
[58] Field of Search ...................... 29/888.09, 888.091, 29/888.092; 225/1, 2, 94, 103

[56] References Cited

U.S. PATENT DOCUMENTS

| | | | |
|---|---|---|---|
| 4,768,694 | 9/1988 | Fabris et al. | 29/888 |
| 5,105,538 | 4/1992 | Hoag et al. | 29/888.09 |
| 5,115,564 | 5/1992 | Miessen et al. | 29/888 |
| 5,169,046 | 12/1992 | Miessen et al. | 225/100 |

FOREIGN PATENT DOCUMENTS 0396797 5/1989 European Pat. Off. .

Primary Examiner—Timothy V. Eley
Attorney, Agent, or Firm—Donald Cayen

[57] ABSTRACT

Apparatus and method for cracking a connecting rod comprises long and short semi-circular dies. The dies include self-contained means for biasing their flat surfaces together to enable them to be inserted through the connecting rod bore. The long die is supported on both sides of the connecting rod. The connecting rod bore initially contacts only the long die. A force generating tool passes through the long die and contacts the flat surface of the second die. The tool operates to separate the two dies against the self-contained biasing means such that both dies contact the connecting rod bore. The tool applies a force to the second die along a plane parallel to the longitudinal axis of the connecting rod bore. The force is sufficient to crack the connecting rod. The force may be either an impulsive force or a relatively slowly applied force. After cracking, the tool is withdrawn from the long die, and the self-contained biasing means biases the two dies against each other ready for insertion into another connecting rod bore.

15 Claims, 5 Drawing Sheets

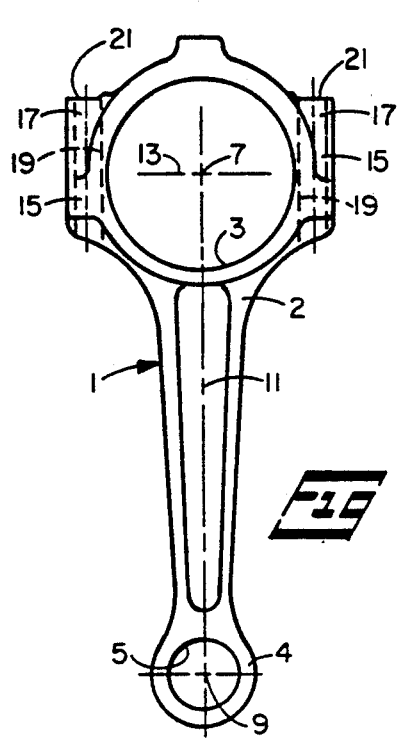
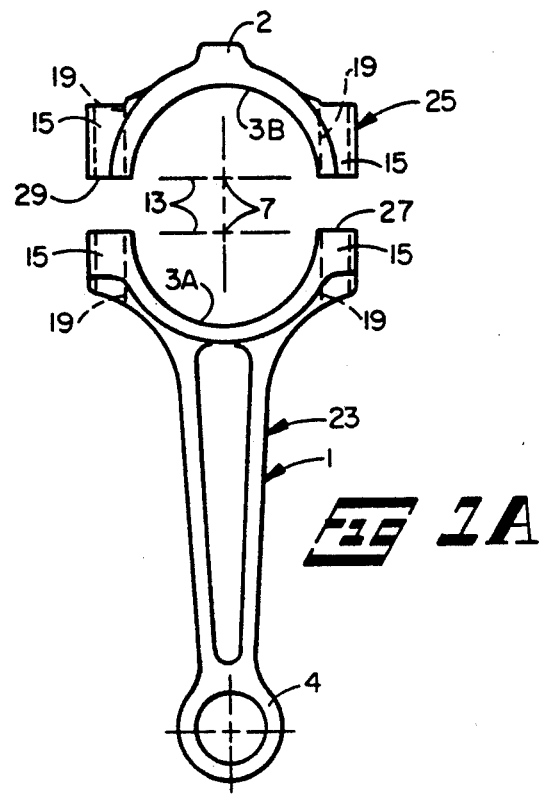
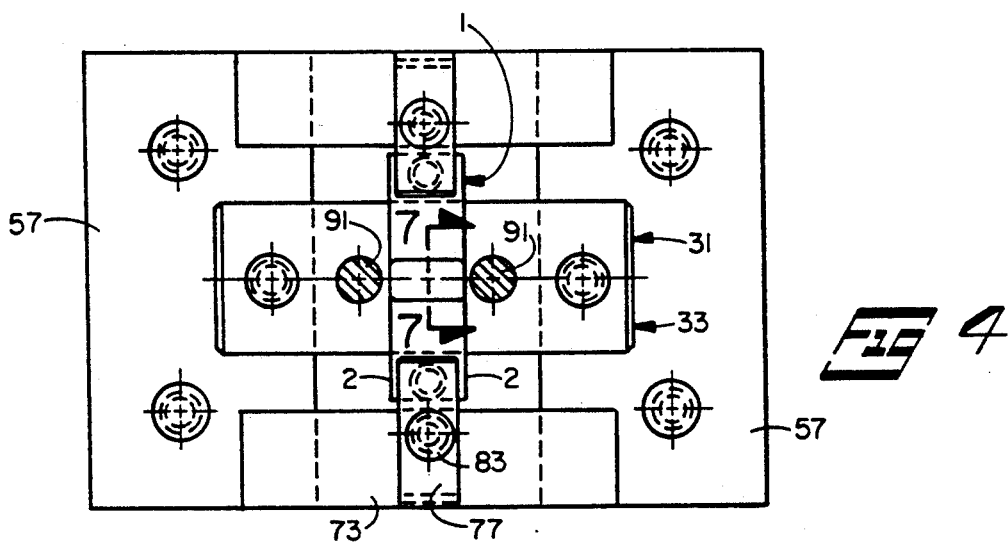
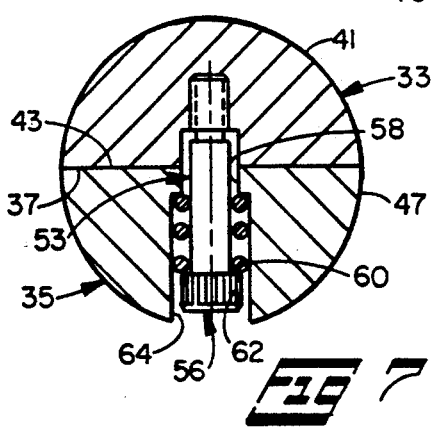
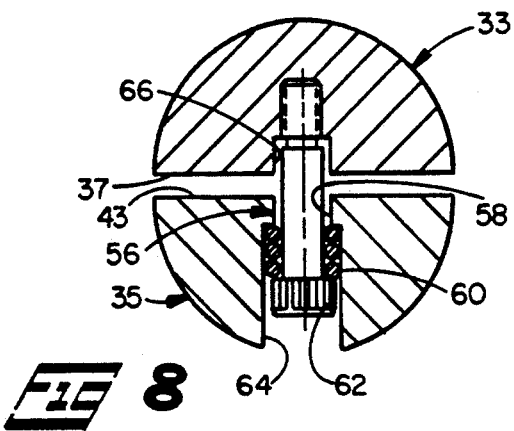

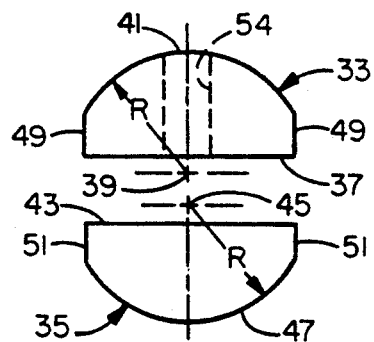 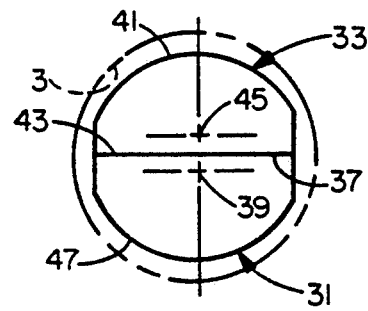
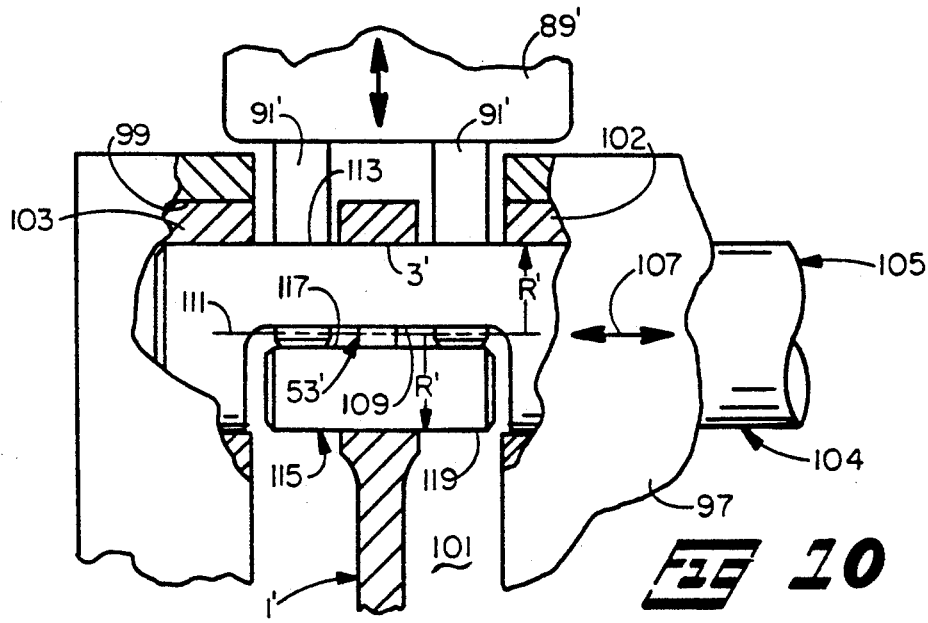
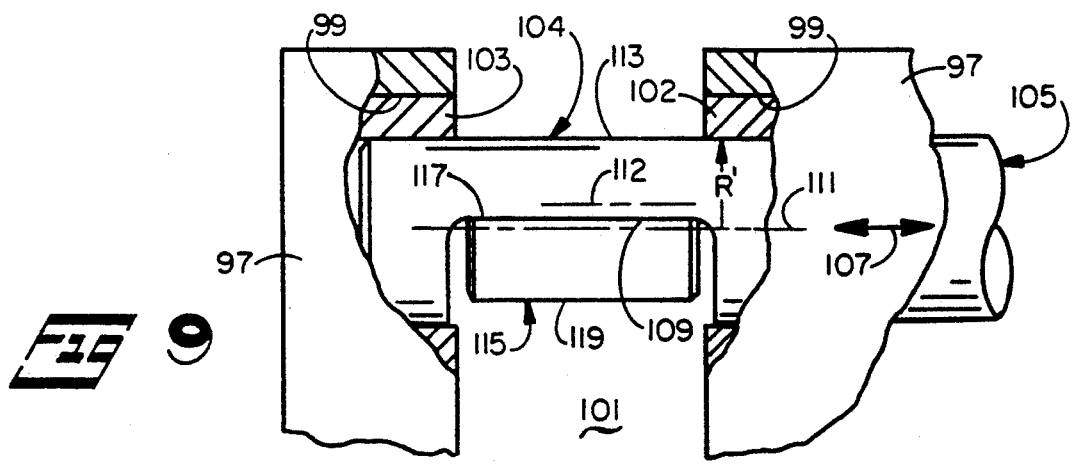

METHOD OF CRACKING A CONNECTING ROD

BACKGROUND OF THE INVENTION

1. Field of the Invention

This invention pertains to manufacturing selected components for reciprocating piston mechanisms, and more particularly to apparatus and methods for cracking engine and compressor connecting rods.

2. Description of the Prior Art

It is known to intentionally crack automotive engine connecting rods into a main rod section and a cap. Cracking occurs along a plane passing through the center of the crankshaft bore. The cap is later reassembled to the main rod section with a crankshaft throw captured therebetween. U.S. Pat. Nos. 3,751,080; 3,818,577; and 3,994,054 illustrate early developments of connecting rod cracking.

More recent examples of techniques and apparatus for performing the cracking process may be seen in U.S. Pat. Nos. 4,569,109; 4,684,267; 4,860,419; and 4,936,163. The prior art cracking apparatus often includes a pair of semi circular dies inserted into the crankshaft bore of a connecting rod. A force is applied to the dies to press them against opposite sides of the crankshaft bore. The dies stress the webs of material on the sides of the bore between the main rod section and the cap until the web separates. In most of the apparatus of the aforementioned patents, an input force is applied in a direction parallel to the plane of cracking. The input force is converted to a direction perpendicular to the plane of cracking by a wedge arrangement. Wedges possess the disadvantage of introducing friction into the cracking apparatus. Consequently, the input forces must be greater than are necessary merely to crack the connecting rods.

U.S. Pat. No. 4,754,906 shows a connecting rod manufacturing system in which a hydraulic cylinder and piston are used to apply an input force that is perpendicular to the cracking plane. Thus, no mechanism for converting force direction is required. On the other hand, the system of 4,754,906 is expensive to manufacture and maintain, and it is not well suited for production use on a continuous basis.

To assure that the connecting rod cracks exclusively within the desired plane, it is vital that there be no relative rotation between the main rod section and the cap during the cracking process. The prior machines and processes, such as are disclosed in the previously mentioned patents, often employ rather elaborate clamps to hold the main rod section and the cap rotationally immovable relative to each other. Such clamping adds to the expense of the cracking machinery and is further undesirable from a maintenance standpoint.

Another common characteristic of the prior connecting rod cracking devices is that they are limited to a large extent to use with connecting rods made of relatively brittle material or manufactured by powder metallurgy techniques. Attempts to crack relatively ductile materials have heretofore been unsuccessful from a commercial standpoint. U.S. Pat. No. 4,768,694 shows a connecting rod fracturing machine that includes cryogenic cooling stations for embrittling connecting rods prior to cracking them. Such cooling equipment and the related cooling processes are undesirably expensive and complicated.

A further drawback of the prior connecting rod cracking machinery is that they support the cracking dies, which extend through the crankshaft bore of the connecting rod, on only one end thereof. That is, the dies are supported in cantilever fashion on one side of the connecting rod. Consequently, the dies bend when the cracking forces are applied to them. Such bending results in non uniform stresses being produced in the webs along the cracking plane. Faulty cracks are a likely consequence.

European patent 0 396 797 shows a rod cracking system in which an impulsive force is applied to a connecting rod in a plane perpendicular to the longitudinal axis of the rod crankshaft bore. The connecting rod is placed over cantilever mounted fixed and movable dies. Separate clamps are installed between the free ends of the two dies and respective supports in an attempt to increase the rigidity of the dies. The separate clamps are cumbersome to handle and are impractical for commercial applications. A further disadvantage of the apparatus of European patent 0 396 797 and of several of the previously mentioned U.S. patents is that one or both of the dies are rigidly fixed to mechanisms that slide relative to the machine frame. During the cracking process, reaction forces are created between the sliding components, and those forces necessarily introduce friction into the system. Increased energy to overcome friction must therefore be applied in order to crack the rods.

Thus, a need exists for improved machines and processes for cracking connecting rods.

SUMMARY OF THE INVENTION

In accordance with the present invention, apparatus and methods are provided that produce higher quality cracked connecting rods than was previously possible. This is accomplished by apparatus that includes a pair of dies that are mutually biased toward each other, with one of the dies being rigidly supported on both sides of the connecting rod and the other die being free floating.

The present invention further comprises a pair of spaced supports located on opposite sides of the connecting rod to be cracked. The supports are rigidly fixed to a heavy and immovable frame. A long die is long enough to span the space between the two supports. The long die has a generally semi-circular cross section with a flat surface and an arcuate surface with a radius that is substantially equal to the radius of the connecting rod crankshaft bore. The center of the long die radius lies outside of the flat surface. A pair of holes extend transversely through the long die perpendicular to the flat surface thereof. The holes are longitudinally spaced along the die at a distance slightly greater than the width of the connecting rod.

A generally semi circular short die has a flat surface and an arcuate surface with a radius that is essentially the same as the radius of the connecting rod crankshaft bore. The center of the radius of the short die lies outside of the flat surface thereof. Consequently, when the flat surfaces of the two dies are in facing contact, the dies define an envelope that is insertable into the crankshaft bore of the connecting rod. The short die is short enough to fit between the two supports.

Further in accordance with the present invention, a spring mechanism that biases the long and short dies against each other is self-contained in the two dies. The spring mechanism biases the dies into a retracted configuration with their flat surfaces in facing contact. When in the retracted configuration, the two dies fit easily through the connecting rod crankshaft bore. The spring mechanism is strong enough to keep the dies together in normal handling, but they are weak enough to have no effect on the cracking operation.

With the retracted dies inserted through the crankshaft bore of a connecting rod, the opposed ends of the long die are placed on the supports. The short die and the connecting rod are located between the supports. A first portion of the connecting rod crankshaft bore contacts the arcuate surface of the long die. The short die is retained in place only by the spring mechanism, and it does not contact the connecting rod bore. A pair of parallel plates or the like are mounted to the supports. The opposite sides of the connecting rod pin end are confined between the plates. The plates locate the connecting rod in proper orientation relative to the supports and prevent any rotation of the rod on the long die. A pair of clamps is adjustably mounted to the supports. The clamps press on bolt faces of the connecting rod to further aid in retaining the connecting rod in proper orientation relative to the supports.

The connecting rod may be cracked by subjecting it to an impulsive force or to a relatively slow acting force. Satisfactory apparatus for applying an impulsive force to the connecting rod includes a fluid powered system with an appropriately designed accumulator, impact tool, valves, and connecting lines. An alternate mechanical system consisting of a spring-loaded mass pre-positioned by a suitable mechanism and having suitable triggering could also be employed. The impact tool of a pneumatic system has an internal free floating piston that is reciprocable in directions parallel to and concentric with the connecting rod axial centerline. To the housing of the tool is mounted a rigid plate. A pair of pins are integrally mounted to the plate and extend from it. The pins are sized and spaced to enter corresponding transverse holes in the long die. The impact tool is mounted to a bracket such that the impact tool is located above the connecting rod and dies. The bracket is movable to slowly advance the impact tool and plate and pins to contact the short die with the pins. The bracket is then further advanced to expand the dies, which are normally in their retracted configuration due to the self-contained spring mechanism, until the arcuate surface of the short die is in intimate contact with a second portion of the connecting rod crankshaft bore opposite the first portion thereof. At that point, compressed air is rapidly introduced into the impact tool housing, accelerating the piston to a high velocity and a corresponding high momentum. Contact by the piston with the bottom of the impact tool housing results in a momentum transfer. Because of the intimate contact between the impact tool, plate, pins, and the short die, and because of the principle of impulse and momentum, the piston momentum is efficiently transferred to the short die. The intimate contact between the connecting rod and the long and short dies causes the momentum to be ultimately converted to an impulsive separating force within the two dies that acts on the connecting rod. The impulsive separating force produces tensile stress in the connecting rod webs alongside the crankshaft bore. The connecting rod fractures at the weakest portions of the webs, those being along a plane passing through the center of the crankshaft bore and containing suitably defined and positioned stress concentration notches. The connecting rod is cracked into two pieces, a main rod section and a cap. The cap remains held in place on the long die by the clamps. The main rod section is propelled a short distance until the pin end thereof strikes a soft surface. An alternate mechanism to capture the main rod section after cracking is a hydraulically damped cylinder that has been positioned to encapsulate a boss on the pin end of the rod.

The connecting rod may be cracked by a relatively slow acting force applied by a hydraulic cylinder that is concentric with the connecting rod axial centerline. The hydraulic cylinder housing is stationarily mounted to the frame. A plate with two integral pins is connected to the piston rod of the hydraulic cylinder. The piston rod is slowly extended to advance the pins through appropriate holes in the long die and into contact with the short die in a manner similar to the initial operation of the bracket that supports the impact tool as previously described. After the hydraulic cylinder has expanded the dies into intimate contact with the entire crankshaft bore of the connecting rod, the pressure to the hydraulic cylinder is increased until sufficient force is produced to crack the connecting rod.

The various features of the present invention combine to produce very high quality connecting rods. The application of the cracking force in a direction perpendicular to the rod cracking plane enables relatively ductile materials to be cracked. The sturdy mounting provided by the dual supports results in minimum and equalized bending of the die such that the deflection of the die portion inside the connecting rod bore has zero slope. The proximity of the pins to the connecting rod contributes to symmetrically applied cracking forces and equalized but minimum deflection. Because there is no sliding associated with either die, no friction is introduced into the apparatus, and thus the force required of the impact tool or hydraulic cylinder is minimized. The self contained spring mechanism in the dies enable them to be rapidly inserted into and removed from the connecting rod crankshaft bore on a production basis.

Other advantages, benefits, and features of the invention will become apparent to those skilled in the art upon reading the detailed disclosure of the invention.

BRIEF DESCRIPTION OF THE DRAWINGS

FIG. 1 is a front view of a typical connecting rod that is advantageously cracked using the apparatus and method of the present invention.

FIG. 1A is a front view of the connecting rod of FIG. 1 shown in the cracked condition.

FIG. 4 is a cross sectional view taken along line 4 of FIG. 2.

FIG. 5 is an end view of the dies of the present invention in an expanded configuration.

FIG. 6 is a view similar to FIG. 5, but showing the dies in the retracted configuration.

FIG. 7 is an enlarged cross sectional view taken along line 7 of FIG. 4 and showing the dies in the retracted configuration.

FIG. 8 is a view similar to FIG. 7, but showing the dies in the expanded configuration.

FIG. 9 is a partially broken front view showing an alternate construction for the apparatus of the present invention.

FIG. 10 is a view similar to FIG. 9, but showing the dies in the expanded configuration.

DETAILED DESCRIPTION OF THE PREFERRED EMBODIMENT

Figure 2:
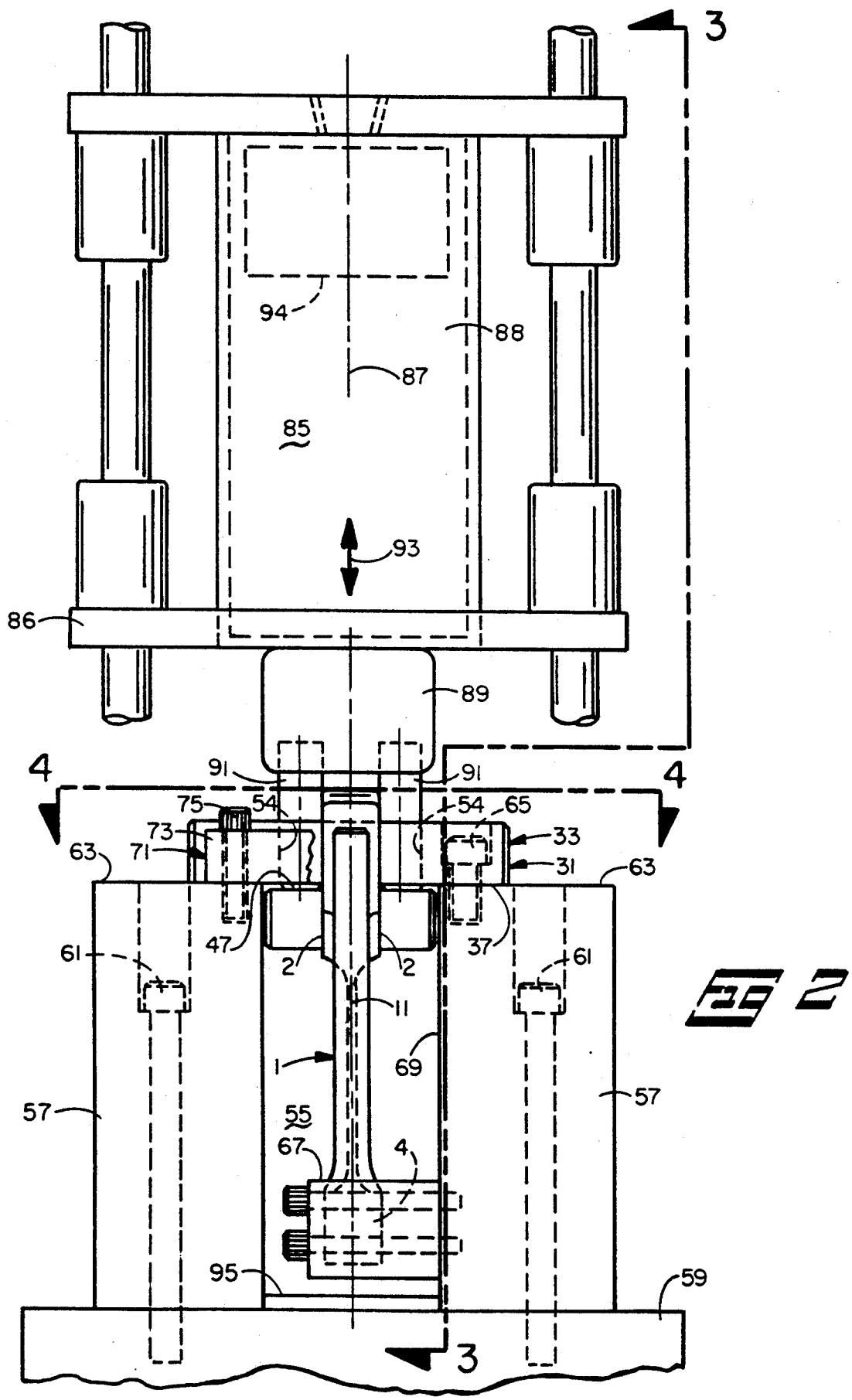
FIG. 2 is a partially broken view of a connecting rod in place on the apparatus of the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

For purposes of background, a connecting rod that is to be cracked by the apparatus and method of the present invention will be briefly described. Referring to FIG. 1, the connecting rod 1 has opposed faces 2, a crankshaft bore 3, a pin end 4, and a piston pin bore 5. The longitudinal axis 7 of the crankshaft bore 3 and the longitudinal axis 9 of the piston pin bore 5 lie on the axial centerline 11 of the connecting rod 1. Reference numeral 13 refers to a plane passing through the longitudinal axis 7 of the crankshaft bore and perpendicular to the connecting rod axial centerline 11. The plane 13 passes through webs 15 of connecting rod material located symmetrically about the longitudinal axis 7. The connecting rod webs 15 include respective bosses 17 through which holes 19 are drilled. The bosses 17 terminate in respective machined bolt faces 21.

The apparatus and method of the present invention are directed to cracking the connecting rod 1 into two pieces along the plane 13 so as to create a main rod section 23 and a cap 25, FIG. 1A. Cracking occurs through the webs 15. Consequently, a cracked surface 27 is created in the main rod section 23, and a mating cracked surface 29 is created in the cap 25. The main rod section 23 contains portion 3A of the crankshaft bore 3, and the cap 25 contains portion 3B of the crankshaft bore, after cracking has occurred. The main rod section 23 and cap 25 are reassemblable by bringing the surfaces 27 and 29 together to reform the crankshaft bore 3. The main rod section and cap are fastenable together with screws, not shown, passing through the holes 19.

Turning to FIGS. 2-6, the apparatus employed to crack the connecting rod 1 comprises an expandable die set 31. The die set 31 is made of a long die 33 and a short die 35. Both dies 33 and 35 have generally semi circular cross sections. The long die 33 has a flat surface 37 and an arcuate surface 41. The arcuate surface 41 has a radius R that is substantially equal to the radius of the connecting rod crankshaft bore 3. The long die flat surface 37 lies a short distance from the center 39 of the radius R in the direction of the arcuate surface 41. Similarly, the short die 35 has a flat surface 43 and an arcuate surface 47. The flat surface 43 lies a short distance from the center 45 of the radius R of the arcuate surface 47 in the direction of the arcuate surface. If desired, opposed flats 49 can be formed in the arcuate surface 41 of the long die, and similar flats 51 can be formed in the arcuate surface 47 of the short die. The long die defines a pair of longitudinally spaced holes 54 that are perpendicular to the flat surface 37. The spacing between the holes 54 is slightly greater than the width of the connecting rod 1 between its faces 2.

The dies 33 and 35 of the die set 31 are normally retained in a retracted configuration with their flat surfaces 37 and 43, respectively, in facing contact. For that purpose, the die set further comprises a self-contained spring mechanism 53. In the particular construction illustrated in FIGS. 7 and 8, the spring mechanism 53 comprises a shoulder screw 56 passing through a hole 58 in the short die 35 and threaded into a counterbore 66 in the long die 33. A spring 60 is captured between the head 62 of the shoulder screw 56 and the bottom surface of a counterbore 64 in the short die. The spring 60 urges the long and short dies toward each other to a retracted configuration, FIG. 7. When in the retracted configuration, the envelope of the die set 31 is well inside the crankshaft bore 3 of the connecting rod 1, FIG. 6.

The long die 33 has a length that is sufficient to span a space 55 between two supports 57. In the apparatus illustrated in FIGS. 2-4, the supports 57 are in the form of blocks attached, as by fasteners 61, to a frame 59. The blocks 57 have respective support surfaces 63. The short die 35 is short enough to fit in the space 55 between the two blocks 57.

The retracted die set 31 of FIGS. 6 and 7 is inserted into the crankshaft bore 3 of the connecting rod 1. The connecting rod and the short die 35 are placed in the space 55 between the two blocks 57, and the flat surface 37 of the long die 33 is placed on the support surfaces 63 of the blocks. The long die may be fastened in place with screws 65. The connecting rod is supported by contact of the portion 3B of the crankshaft bore 3 on the long die arcuate surface 41. There is clearance between the portion 3A of the crankshaft bore and the short die arcuate surface 47. Except for the relatively weak force of the spring 60 of the spring mechanism 53, the short die is free to float within the crankshaft bore.

It is important that the connecting rod 1 be accurately aligned and rigidly clamped for cracking to occur successfully. Proper alignment is achieved when the rod plane 13 is parallel with the long die flat surface 37. That alignment may be achieved by a pair of fixed flat plates 67 supported on a mounting surface 69 of a block 57. The plates 67 are located in the space 55 between the two blocks 57. The plates are spaced apart to receive between them with minimum clearance the pin end 4 of the connecting rod 1. The pin bore 5 is preferably coplanar with the centerlines of the plates.

To rigidly clamp the connecting rod 1 to the die set 31, a clamp mechanism 71 is employed. The particular clamp mechanism 71 shown illustrates a pair of bars 73 that straddle the space 55 between the blocks 57. The bars 73 are held in place on the supports by fasteners 75. A lever 77 is associated with each bar 73. Each lever 77 has a fulcrum 79 and a pad 81. A screw 83 between the fulcrum 79 and the pad 81 is used to hold the pad against a bolt face 21 of the connecting rod 1. When the connecting rod is aligned and clamped, it is ready to be cracked.

The connecting rod 1 may be cracked by applying an impulsive force to it in directions perpendicular to the plane 13. To carry out that method, a preferred mechanism is a typical high energy impactor 85. A Branford High Energy Impactor, Model LI-32, having a capacity of 256 foot pounds of imparted energy, is satisfactory. The housing 88 of the impact tool 85 may be mounted to a bracket 86 such that the longitudinal axis 87 of the impact tool is concentric with the axial centerline 11 of the connecting rod 1. To the end of the housing 88 of the impact tool is attached a heavy plate 89. A pair of stout pins 91 extend from the plate 89 The pins 91 are sized and spaced to fit within the holes 54 in the long die 33 of the die set 31. The pins thus lie in a plane parallel to and preferably containing the longitudinal axis 7 of the connecting rod crankshaft bore 3. The pins 91 lie close to the opposed faces 2 of the connecting rod 1.

The bracket 86 is movable by a conventional drive mechanism, not shown, relative to the frame 59 and the blocks 57 in the directions of arrow 93. The drive mechanism is operated to advance the bracket, impact tool 85, plate 89, and pins 91 in unison toward the die set 31. Advancement continues to cause the pins to enter the holes 54 in the long die 33 until the free ends of the pins contact the flat surface 43 of the short die 35. A slight additional movement by the bracket 86 overcomes the force of the spring 60 of the spring mechanism 53 and pushes the short die away from the long die. That motion continues until the arcuate surface 47 of the short die contacts the bore portion 3A of the crankshaft bore 3. Then the impact tool 85 is actuated to produce full velocity in the downward direction with respect to FIG. 2 on an internal piston 94 within the impact tool housing 88. The piston 94 bottoms inside the housing 88, producing an efficient transfer of momentum to the housing and to the attached plate and pins and ultimately to the short die. The momentum immediately tends to separate the short die from the long die. Because the dies are in intimate contact with the rod crankshaft bore, and the dies cannot separate from each other, the momentum is immediately converted to an impulsive force acting between the short die and the crankshaft bore surface 3A. The impulsive force in turn causes tensile stress across the webs 15 of sufficient magnitude to crack the rod along the plane 13 into the main rod section 23 and the cap 25. During separation of the rod, there is a slight movement of the short die and of the bracket 86, impact tool 85, plate 89, and pins 91. The main rod section is propelled away from the die set 31, and the connecting rod pin end 4 strikes a cushion 95.

Figure 11:
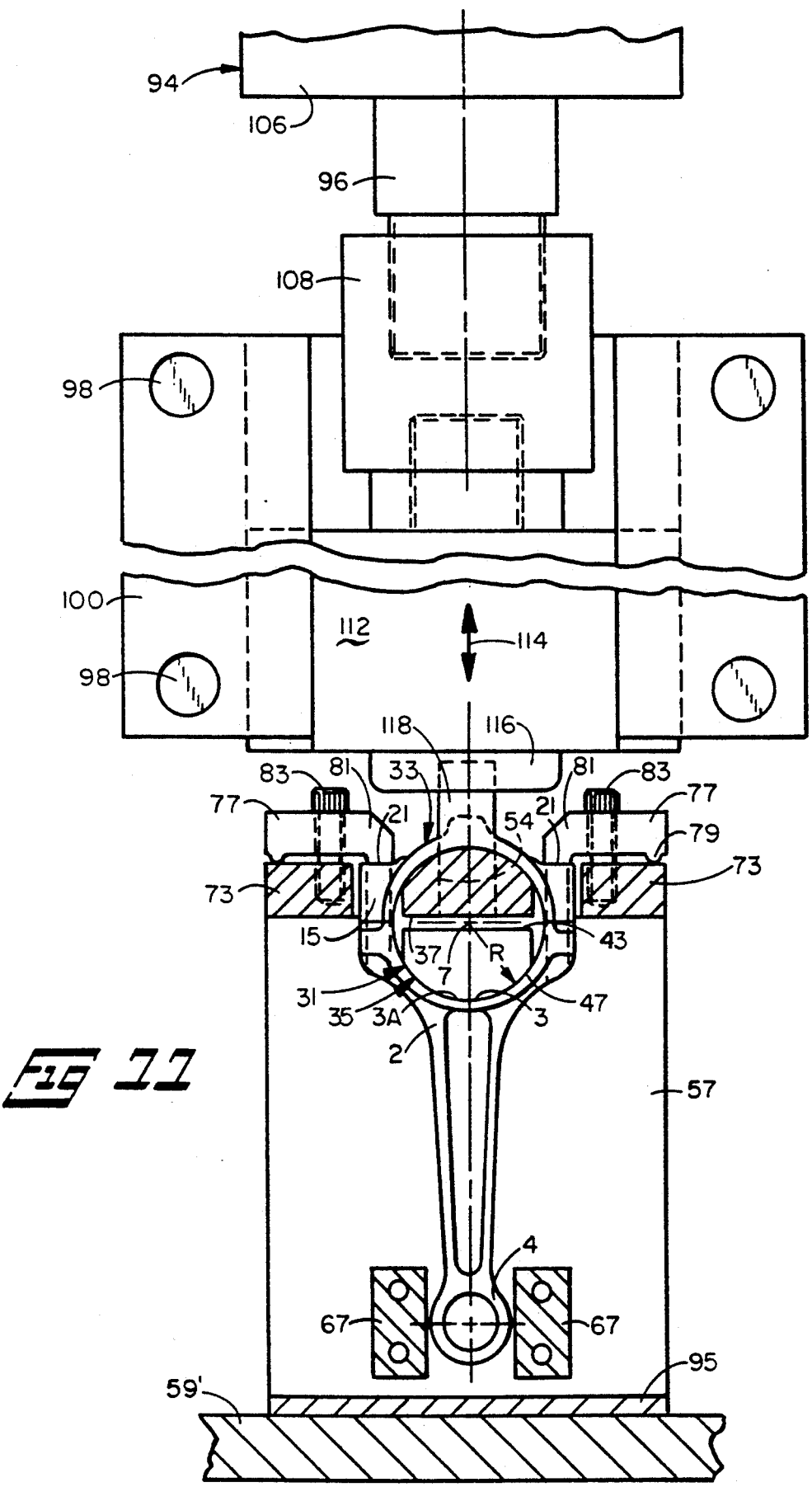
FIG. 11 is a view similar to FIG. 3, but showing alternate apparatus for applying a cracking force to a connecting rod.

FIG. 11 shows another mechanism for applying the force necessary to crack a connecting rod 1. In FIG. 11, the cracking force is produced by a relatively slow acting hydraulic cylinder 94 that has a piston rod 96. The housing 106 of the hydraulic cylinder 94 is stationarily mounted to the frame 59'. Also stationarily mounted to the frame 59' by screws 98 is a slide bearing 100. The hydraulic cylinder piston rod 96 is connected to a misalignment coupling 108. In turn, the coupling 108 is joined to a slide block 112 that is slidably captured within the slide bearing 100 for reciprocation in the directions of arrow 114. If desired, a load cell (not shown) can be interposed between the coupling 108 and the end of the piston rod 96. To the opposite end of the slide block 112 as the coupling 108 is a rigid plate 116 containing a pair of integral pins 118. The pins 118 are identical to the pins 91 described previously in connection with the impact tool 85 of FIGS. 2 and 3.

The hydraulic cylinder 94 of FIG. 11 is operated to slowly advance the piston rod 96, and with it the optional load cell, coupling 108, and slide block 112, such that the pins 118 enter the associated holes 54 in the long die 33. Slow advancement continues until the pins strike the short die 35 and separate the die set 31 into its expanded configuration. At that point the short die arcuate surface 47 is in intimate contact with the portion 3A of the connecting rod bore 3. Then the pressure to the hydraulic cylinder is increased to an amount sufficient to crack the connecting rod 1 along its plane 13.

Because neither the long die 33 nor the short die 35 is mounted to any mechanism that slides relative to the frame 59, no friction forces are introduced during the cracking process. Consequently, only a force sufficient to crack the rod is required to be produced by either the impact tool 85 of FIGS. 2 and 3 or the hydraulic cylinder 94 of FIG. 11. The free floating nature of the short die also contributes greatly to the efficiency of the cracking process of the present invention.

Figure 3:
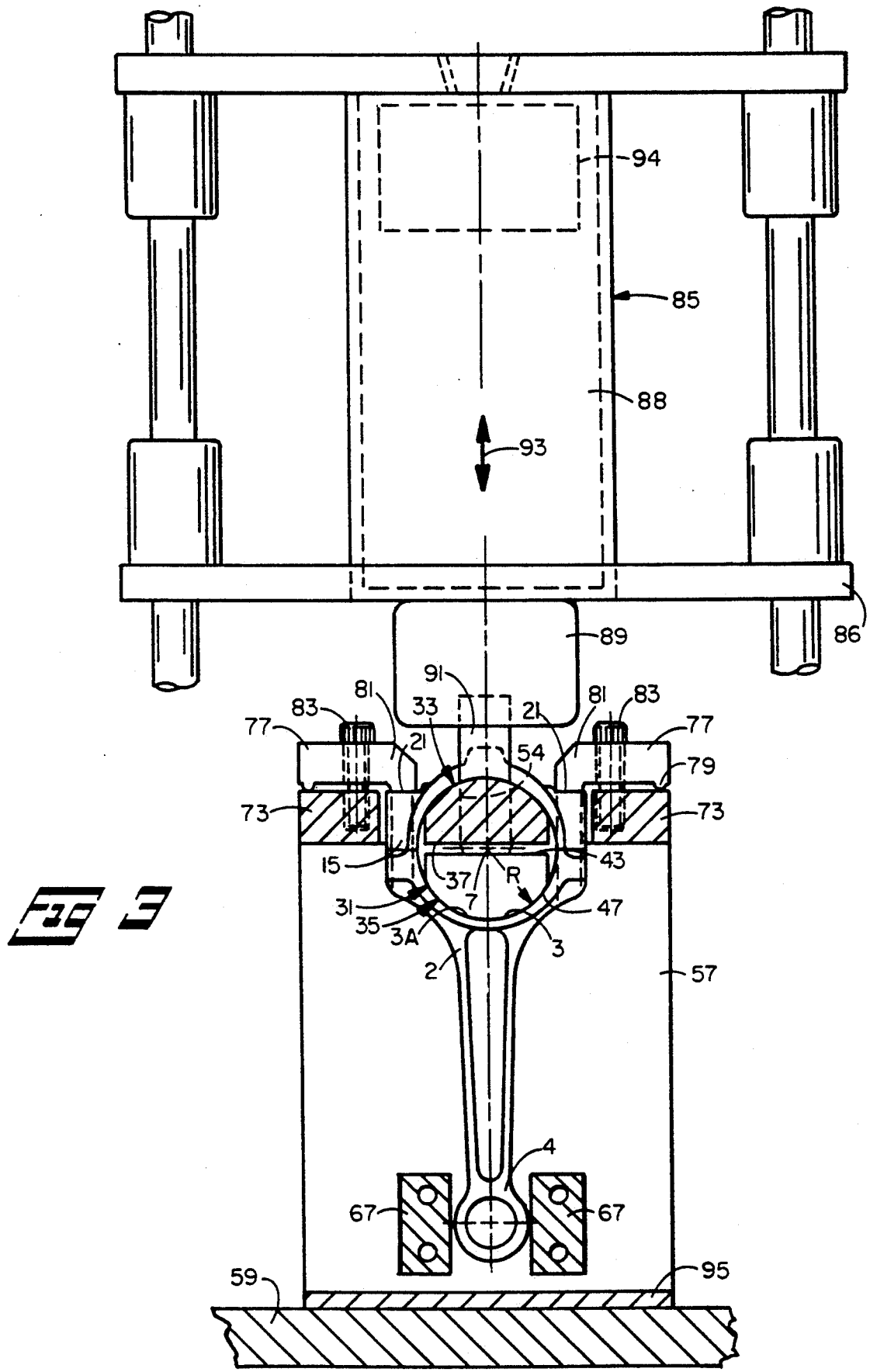
FIG. 3 is a cross sectional view taken along line 3 of FIG. 2.

After the drive mechanism moves the bracket 86 upwardly with respect to FIGS. 2 and 3 to withdraw the pins 91 from the long die holes 54, or the hydraulic cylinder 94 moves the piston rod 96 upwardly with respect to FIG. 11, the levers 77 are released. The cap 25 is removed from the long die 33. The cap and main rod section are then brought back together for further processing. The spring mechanism 53 causes the long and short dies to retract to their configuration of FIGS. 6 and 7. The crankshaft bore 3 of a new connecting rod can then be placed over the die set.

FIGS. 9 and 10 show an alternate construction for apparatus according to the present invention. Supports 97 have concentric bores 99 separated by a space 101. Bushings 102 and 103 are inserted into the respective support bores 99. A die set 104 has a long die 105 that is generally cylindrical in shape and is slidable within the bushings 102 and 103 in the directions of arrow 107. The long die 105 has a longitudinal axis 111 and an arcuate surface 113. The radius R' of the long die arcuate surface 113 is substantially equal to the radius of the crankshaft bore of a connecting rod. The long die 105 has a flat surface 109 machined in it. The flat surface 109 lies on the same side of the longitudinal axis 111 as the arcuate surface 113. A short die 115 is generally semi circular in shape and has an arcuate surface 119 with a radius R' about a longitudinal axis 112. The short die 115 has a flat surface 117 that is on the same side of the short die longitudinal axis 112 as the arcuate surface 119. A spring mechanism substantially similar to the spring mechanism 53 described previously is employed to retain the flat surfaces 109 and 117 of the die set 104 against each other.

The long die 105 with the short die 115 retained against it by the spring mechanism is pulled from the bushing 103 and the space 101. A connecting rod 1' is placed in the space 101 with the crankshaft bore 3' concentric with the long die axis 111. Then the long die is pushed back into the bushing 103.

A plate 89' and pins 91' are part of a mechanism that is driven by either an impact tool or a hydraulic cylinder, not shown in FIGS. 9 and 10. The pins 91' pass through appropriate holes, not shown, in the long die 105 to contact the flat surface 117 of the short die 115. The pins lie in a plane parallel to and preferably containing the long die longitudinal axis 111.

The impact tool or hydraulic cylinder is operated to insert the pins 91' into the long die holes and to slightly separate the long and short dies 105 and 115, respectively, from each other against the spring mechanism 53', as is shown in FIG. 10. Separation continues until the arcuate surfaces 113 and 119 of both dies are in contact with the connecting rod bore 3'. Then the impact tool or hydraulic cylinder is actuated to apply the force to the short die necessary to crack the connecting rod 1'. Because of the rigid support for the long die within the bushings 102 and 103, distortion of the cracked connecting rod is minimal.

Thus, it is apparent that there has been provided, in accordance with the invention, a connecting rod cracker that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of cracking a connecting rod along a predetermined plane passing through a bore therein having a longitudinal axis comprising the steps of:
   a. inserting a die set through the connecting rod bore;
   b. supporting the die set on spaced supports with the connecting rod located in the space between the supports; and
   c. applying a force to the die set along a plane parallel to the connecting rod bore longitudinal axis sufficient to crack the connecting rod into a main rod section and a cap.

2. A method of claim 1 wherein the step of applying a force to the die set comprises the step of applying forces to the die set at two spaced apart locations that lie generally in a plane that contains the longitudinal axis of the connecting rod bore and that are located on opposite sides of the connecting rod.

3. A method of cracking a connecting rod along a predetermined plane passing through a bore therein having a longitudinal axis comprising the steps of:
   a. inserting a die set through the connecting rod bore, wherein the step of inserting a die set into the connecting rod bore comprises the steps of:
      i. providing first and second dies;
      ii. providing the first and second dies with biasing means for coacting between the dies to bias them toward each other; and
      iii. operating the biasing means to coact between the first and second dies to bias them against each other to form an envelope than enables the dies to be inserted into the connecting rod bore;
   b. supporting the die set on spaced supports with the connecting rod located in the space between the supports; and
   c. applying a force to the die set along a plane parallel to the connecting rod bore longitudinal axis sufficient to crack the connecting rod into a main rod section and a cap.

4. The method of claim 3 wherein the step of applying a force to the die set comprises the steps of:
   a. passing a tool through the first die and into contact with the second die; and
   b. actuating the tool to apply a force to the second die sufficient to crack the connecting rod.

5. The method of claim 4 wherein:
   a. the step of inserting a die set through the connecting rod bore comprises the step of contacting a first portion of the connecting rod bore with the first die and providing a space between the second die and a second portion of the connecting rod bore opposite the first portion thereof; and
   b. the step of passing the tool through the first die and into contact with the second die comprises the step of advancing the tool against the second die to expand the second die away from the first die and into contact with the second portion of the connecting rod bore.

6. A method of cracking a connecting rod having a bore along a plane passing through the bore comprising the steps of:
   a. inserting first and second dies through the connecting rod bore;
   b. passing a tool through the first die;
   c. contacting the second die with the tool;
   d. actuating the tool to apply a force to the second die sufficient to crack the connecting rod; and
   e. transferring the force from the second die to the connecting rod and from the connecting rod to the first die thereby cracking the connecting rod.

7. The method of claim 6 wherein the step of inserting first and second dies into the connecting rod bore comprises the steps of:
   a. providing biasing means coacting between the first and second dies; and
   b. biasing the first and second dies into a retracted configuration whereat the dies are in contact with each other.

8. The method of claim 7 comprising the further step of advancing the tool against the second die to expand the first and second dies out of contact with each other prior to actuating the tool.

9. The method of claim 6 wherein the step of inserting first and second dies into the connecting rod bore comprises the further step of supporting the first die on a pair of supports with a space therebetween with the connecting rod in the space between the supports.

10. A method of cracking a connecting rod through a bore therein having a longitudinal axis comprising the steps of:
    a. inserting first and second dies through the connecting rod bore;
    b. supporting a first portion of the connecting rod bore on the first die;
    c. moving the second die into contact with a second portion of the connecting rod bore;
    d. applying a force directly to only the second die along a plane parallel to the longitudinal axis of the connecting rod bore; and
    e. transferring the force from the second die to the connecting rod and from the connecting rod to the first die to crack the connecting rod.

11. The method of claim 10 wherein the step of supporting a portion of the connecting rod bore on the first die comprises the steps of:
    a. supporting the first die on a pair of spaced fixed supports; and
    b. locating the connecting rod between the supports.

12. The method of claim 10 wherein the step of applying a force directly to only the second die comprises the step of applying two forces to the second die at spaced apart locations that lie generally in a plane that contains a longitudinal axis of the connecting rod bore and that are located on opposite sides of the connecting rod.

13. A method of cracking a connecting rod through a bore therein having a longitudinal axis comprising the steps of:
    a. inserting first and second dies through the connecting rod bore;
    b. supporting a first portion of the connecting rod bore on the first die;
    c. moving the second die into contact with a second portion of the connecting rod bore, wherein the step of moving the second die into contact with a second portion of the connecting rod bore comprises the steps of:
       i. passing a tool through the first die;
       ii. contacting the second die with the tool; and iii. expanding the second die away from the first die and into contact with the second portion of the connecting rod bore;

b. applying a force to the second die along a plane parallel to the longitudinal axis of the connecting rod bore; and c. transferring the force from the second die to the connecting rod and from the connecting rod to the first die to crack the connecting rod.

14. The method of claim 13 comprising the step of withdrawing the tool from the first die subsequent to applying the force and cracking the connecting rod.

15. The method of claim 14 comprising the further step of mutually biasing the first and second dies into a retracted configuration against each other subsequent to withdrawing the tool from the first die.

* * * * *